(12) United States Patent
Goodermuth et al.

(10) Patent No.: US 8,441,143 B2
(45) Date of Patent: May 14, 2013

(54) METHOD AND SYSTEM FOR RAIL VEHICLE POWER DISTRIBUTION AND MANAGEMENT

(75) Inventors: Todd William Goodermuth, Melbourne, FL (US); Wolfgang Daum, Erie, PA (US); Mark Kraeling, Melbourne, FL (US); Jared Klineman Cooper, Palm Bay, FL (US); Ning Zhang, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 308 days.

(21) Appl. No.: 12/840,345

(22) Filed: Jul. 21, 2010

(65) Prior Publication Data

US 2012/0019058 A1    Jan. 26, 2012

(51) Int. Cl.
*B60L 1/00*    (2006.01)

(52) U.S. Cl.
USPC ................................................. 307/9.1; 307/34

(58) Field of Classification Search .................. 700/295; 307/9.1, 34
See application file for complete search history.

(56) References Cited

U.S. PATENT DOCUMENTS

| | | | |
|---|---|---|---|
| 5,073,686 A * | 12/1991 | Gabriel | 200/254 |
| 6,366,951 B1 * | 4/2002 | Schmidt | 709/208 |
| 7,420,293 B2 * | 9/2008 | Donnelly et al. | 307/34 |
| 7,593,963 B2 | 9/2009 | Ballesty et al. | |
| 7,761,198 B2 * | 7/2010 | Bhardwaj | 701/19 |

* cited by examiner

*Primary Examiner* — Daniel Cavallari
(74) *Attorney, Agent, or Firm* — GE Global Patent Operation; John A. Kramer

(57) ABSTRACT

A rail vehicle system and a method for managing distribution of power in the rail vehicle system are provided.

17 Claims, 8 Drawing Sheets

METHOD AND SYSTEM FOR RAIL VEHICLE POWER DISTRIBUTION AND MANAGEMENT

FIELD

The subject matter disclosed herein relates to managing distribution of power in a locomotive or other rail vehicle.

BACKGROUND

When a locomotive or other rail vehicle is not in transit, such as when the locomotive resides in a rail yard or station, the locomotive may be placed in a standby condition where an internal combustion engine of the locomotive is shut-off. By shutting off the engine, combustion does not occur. As such, fuel is preserved and emissions are reduced.

In one example, during the standby condition, some applications and/or appliances on the locomotive remain active to provide communication capabilities, record events, take sensor measurements, etc. The applications and/or appliances that remain active during the standby condition are powered by an energy storage device on the locomotive, such as a battery.

The inventors herein have recognized some issues in such systems. For example, if the locomotive engine is not started in a timely manner, then the locomotive applications and/or appliances that remain active during the standby condition compete for power from the battery, resulting in battery dissipation. Upon battery dissipation, a state of charge of the battery may be too low to facilitate engine starting. Further, upon battery dissipation, the applications and/or appliances abruptly lose power without having an opportunity to properly shut down, which results in potential data loss and/or corruption.

BRIEF DESCRIPTION OF THE INVENTION

Methods and systems are provided for managing distribution of power in a locomotive or other rail vehicle. In one embodiment, a rail vehicle system is provided. The rail vehicle system comprises a power source to generate electrical power, a battery to store electrical power that is generated by the power source, and a knife switch that is connected between the power source and the battery. The knife switch is actuatable to disconnect the battery from the power source. The rail vehicle system further comprises a power management system that is connected on either side of the knife switch. The power management system manages selective distribution of power to a plurality of electronic applications and/or appliances based on a rule set. Thus, during the standby condition when no power is being generated by the engine, the applications and/or appliances that generate a power load on the battery can be shut-off in a coordinated and orderly manner to prevent battery dissipation. The power management system may be particularly beneficial for shutting off applications and/or appliances that are connected on the battery-side of the knife switch, because these applications and/or appliances, if left on, generate a power load on the battery even when the knife switch is open that results in battery dissipation. However, it may also be used on the upstream (non-battery) side of the knife switch. In this way, a state of charge of the battery can be preserved for various rail vehicle system operations, such as engine starting. Moreover, by systematically shutting-off power to targeted applications and/or appliances during the standby condition, the applications and/or appliances are able to be suitably shut down prior to power loss. In this way, data loss and/or corruption can be inhibited.

This brief description is provided to introduce a selection of concepts in a simplified form that are further described herein. This brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure. Also, the inventor herein has recognized any identified issues and corresponding solutions.

BRIEF DESCRIPTION OF THE DRAWINGS

The present invention will be better understood from reading the following description of non-limiting embodiments, with reference to the attached drawings, wherein below.

DETAILED DESCRIPTION

The present description relates to locomotives, or other rail vehicles, that include integrated systems for managing power distribution to various locomotive (or other rail vehicle) electronic applications and/or appliances. The power distribution management systems and methods described herein provide the ability to selectively shut-off applications and/or appliances in a predefined manner to shed power load. For example, the power distribution management systems perform power load shedding operations during standby conditions where a locomotive engine is shut-off by targeting applications and/or appliances connected on a battery-side of the knife switch that generate a power load on the battery that causes a state of charge of the battery to decrease. The power load shedding operations are performed in order to preserve battery power. The power distribution management systems allow for applications and/or appliances on the battery-side of the knife switch to remain on even after the engine is shut-off to provide various locomotive-related functions, and upon battery dissipation the applications and/or appliances are shut-off in a targeted and orderly manner to preserve the state of charge of the battery at a suitable level for performing locomotive system operations, such as engine starting.

One example of such a configuration is illustrated with reference to FIG. 1 wherein a power management system manages selective distribution of power to a plurality of applications and/or appliances that are connected on the battery-side of a knife switch. The power management system selectively shuts off the applications and/or appliances based on a rule set that governs operational priorities of the locomotive.

Figure 2:
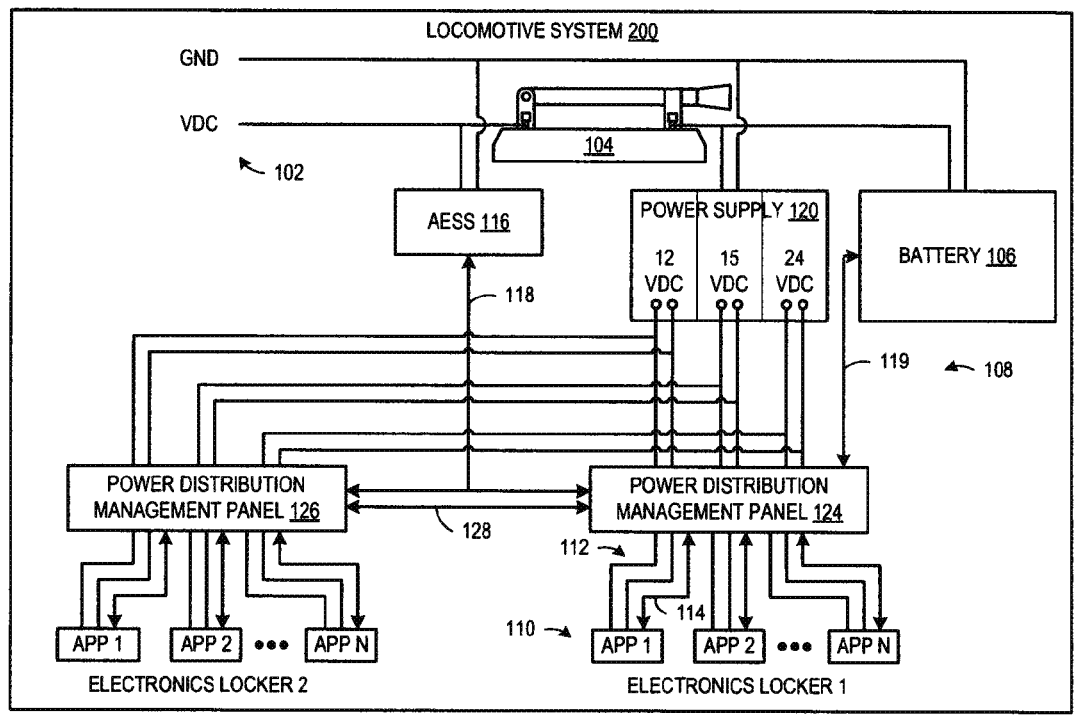
FIG. 2 schematically shows an example embodiment of a rail vehicle system including a plurality of power distribution management panels.

Furthermore, as elaborated in FIG. 2, in some embodiments, a plurality of power distribution management panels that are distributed throughout the locomotive system communicate with each other to coordinate power load shedding operations or to selectively distribute power to applications and/or appliances connected on the battery-side of the knife switch.

Figure 3:
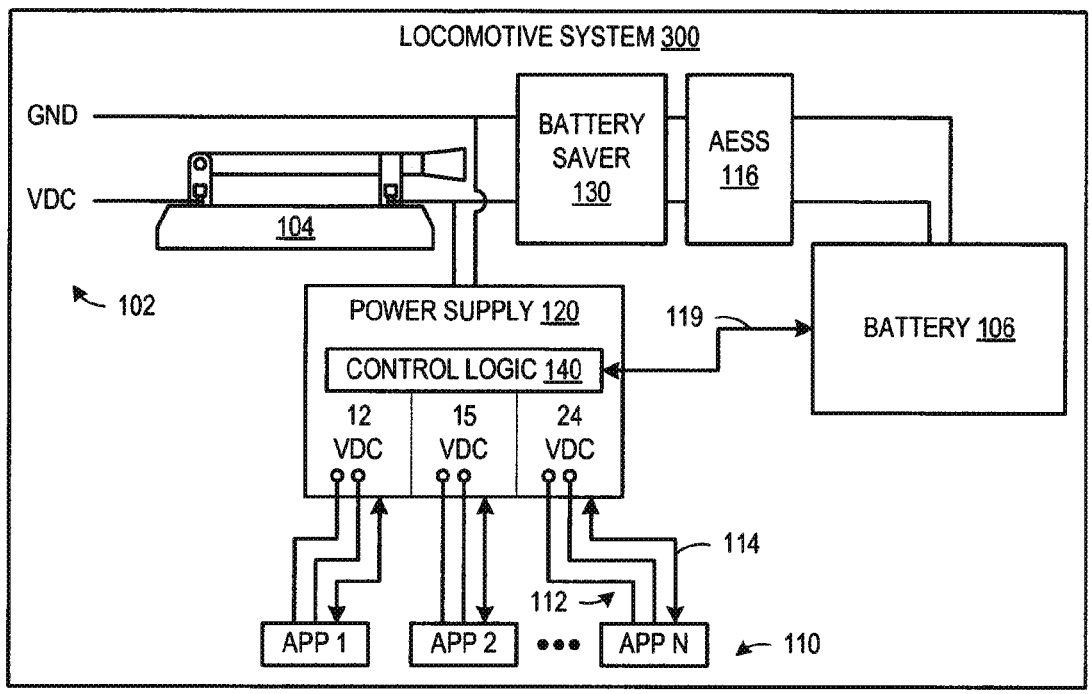
FIG. 3 schematically shows an example embodiment of a rail vehicle system including a modular power supply for selectively distributing power at a plurality of different voltage levels.

Alternatively, as shown in FIG. 3, a modular power supply, connected on the battery-side of the knife switch, includes control logic to selectively distribute power at a plurality of different voltage levels to different applications and/or appliances connected on the battery-side of the knife switch. In other words, different applications and/or appliances selectively receive power from the different power modules of the modular power supply at the different voltage levels. In such a configuration, power load shedding is performed at a per voltage level basis based on a rule set by selectively shutting off power to one or more of the power modules at the different voltage levels and correspondingly shutting off the applications and/or appliances receiving power from the power module at that voltage level.

Figure 4:
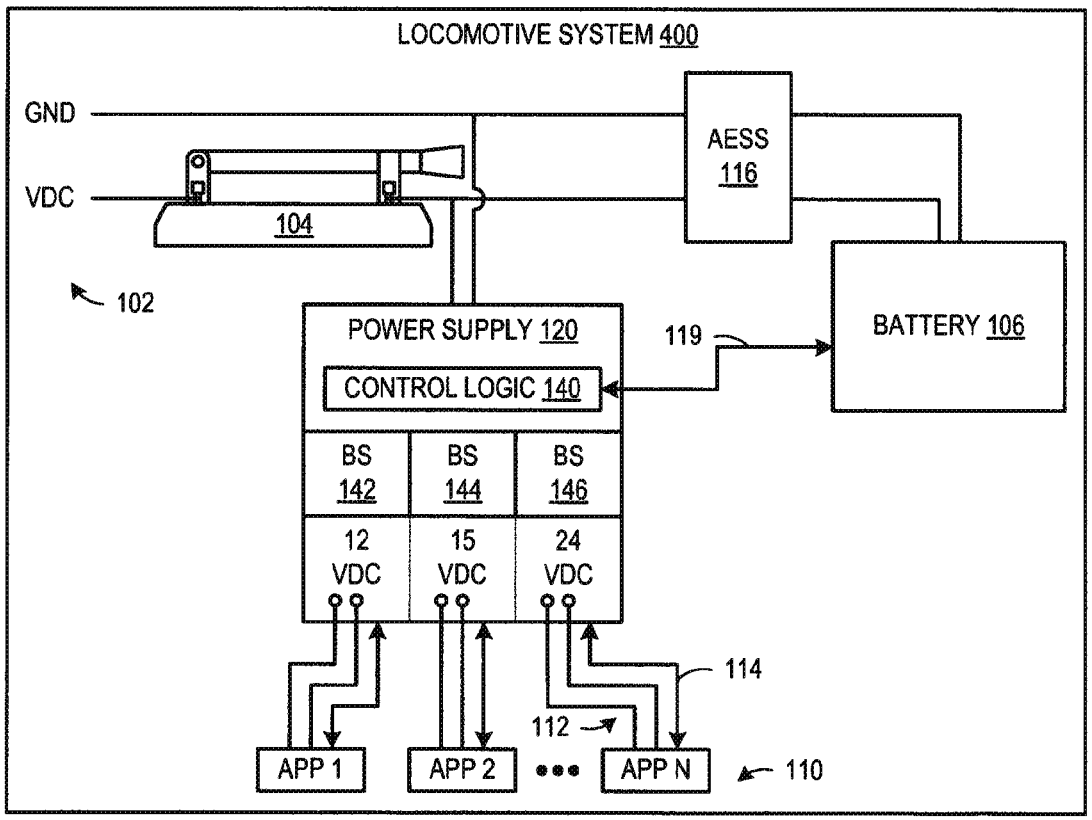
FIG. 4 schematically shows an example embodiment of a rail vehicle system including a modular power supply having a plurality of integrated battery saving devices corresponding to each voltage level.

Furthermore, as elaborated in FIG. 4, a battery saving device is integrated into each of the power modules of the modular power supply to selectively extend the operating time of the applications and/or appliances receiving power from the different power modules before load shedding is performed.

Accordingly, by providing such power distribution management and power load shedding capabilities, applications and/or appliances connected on the battery-side of the knife switch may remain on to perform various operations (e.g., communication and monitoring) even when the engine is shut-off without draining the battery. Also, applications and/or appliances are selected for shut-off in a targeted fashion according to a rule set tailored to customer wants. The selected applications and/or appliances are notified of impending power loss so the selected applications and/or appliances can shut down prior to power loss in order to prevent data loss and/or corruption. Further, locomotives may achieve increased fuel efficiency and reduced emissions since the engine does not have to be started as frequently. Further still, consistent engine startup is achieved since battery state of charge is preserved. Moreover, all of these benefits combine to provide an overall reduction in operation costs.

Figure 1:
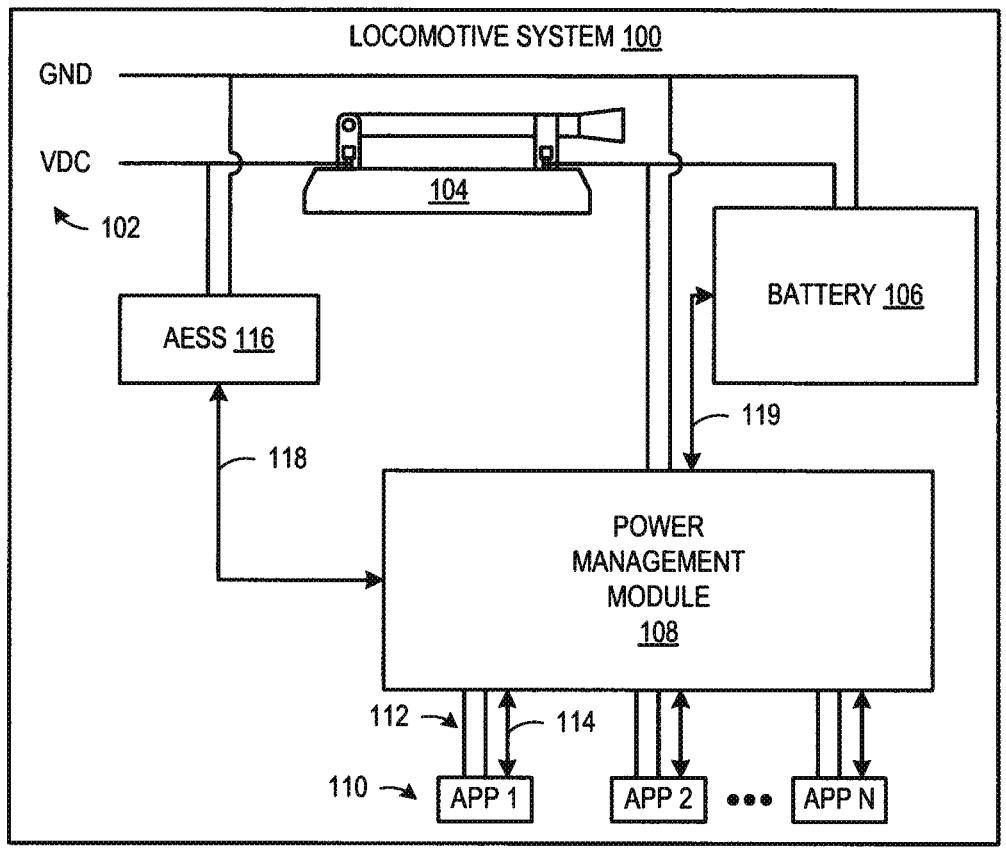
FIG. 1 schematically shows an example embodiment of a rail vehicle system including a power management system for managing distribution of power.

FIG. 1 is a block diagram of an example embodiment of a rail vehicle system 100 that is configured to run on a track. In one example, the rail vehicle is a diesel-electric locomotive that operates a diesel engine (not shown). However, in alternative embodiments of the rail vehicle system 100, alternate engine configurations may be employed, such as a gasoline engine or a biodiesel or natural gas engine, for example. The engine is operable to generate torque that is transmitted to an alternator (not shown). The generated torque is used by the alternator to generate electricity for subsequent propagation to the rail vehicle. The rail vehicle engine may be run at a constant speed, thereby generating a constant horsepower output, or at variable speeds generating variable horse power output, based on operational demand. The electrical power generated in this manner may be referred to as the prime mover power generated from a power source 102. Based on the nature of the generated electrical output, the electrical power may be distributed as direct current (as depicted) or as alternating current.

The power source 102 provides power, for example, at 74 volts direct current (VDC) to a variety of downstream electrical components of the rail vehicle system 100. It will be appreciated that electrical power may be provided at any suitable voltage level. As another example, electrical power may be provided at 110 VDC. A battery 106 is connected downstream of the power source 102. During engine operation, 74 VDC is provided by the power source 102 to the battery 106 to increase a state of charge of the battery 106, under some conditions. A knife switch 104 is connected in-line between the power source 102 and the battery 106. Knife switch 104 refers to a switch that is selectively actuatable (e.g., manually actuatable) to connect/disconnect the power source 102 to the battery 106. More particularly, as discussed above, the rail vehicle system 100 may be placed in a standby condition where the engine is shut-off. For example, the rail vehicle system 100 may be placed in the standby condition to reduce fuel consumption, such as when a locomotive or other rail vehicle resides in a rail yard or station. As another example, the rail vehicle system 100 may be placed in a standby condition due to engine fault or degradation that causes dissipation of the battery 106. During the standby condition, an operator opens the knife switch 104 to disconnect the battery 106 from the power source 102 in order to prevent undesired engine starting.

An automatic engine start stop (AESS) system 116 is positioned between the power source 102 and the knife switch 104. The AESS system 116 is operable to enable the engine of the power source 102 to be automatically started and stopped. The AESS system 116 commands the engine to automatically start and stop upon fulfillment of AESS criteria. In particular, the AESS system 116 monitors locomotive (or other rail vehicle) operating parameters. Upon verifying that AESS criteria are met, the AESS system 116 sends commands to the gamut of engine control hardware components such as invertors, relays, alternator, fuel pumps, etc. to start the engine. In one example, AESS criteria dictates starting the engine in response to a state of charge of the battery 106 dropping below a threshold and stopping the engine when the battery 106 is suitable charged. As another example, AESS criteria dictate starting the engine in response to a temperature of the engine dropping below threshold. As yet another example, AESS criteria dictates starting/stopping the engine at predefined times or intervals. As yet another example, AESS criteria dictate starting/stopping the engine as commanded by an operator.

The engine may be started with any suitable engine starting system. In one example, a generator start may be performed wherein the electrical energy produced by a generator or alternator may be used to start the engine. Alternatively, the engine starting system may comprise a motor, such as an electric starter motor, or a compressed air motor, for example. It will also be appreciated that the engine may be started using energy in a battery system, or other appropriate energy sources.

A power management system 108 is connected between the knife switch 104 and the battery 106. The power management system 108 manages distribution of power to a plurality of locomotive (or other rail vehicle) electronic applications and/or appliances 110 that are connected to the power management system 108 on the battery-side of the knife switch 104 by power connectors 112. In particular, the power management system 108 receives 74 VDC from a battery-side of the locomotive (or other rail vehicle) knife switch 104 and converts the native voltage to a plurality of different voltage levels (e.g., 12 VDC, 15 VDC, and 24 VDC) that are suitable for powering the plurality of applications and/or appliances 110. Examples of the applications and/or appliances 110 that connect to and receive power from the power management system 108 include train management computers (TMC), radio communication devices, event recorders (ER), end of train sensors (EOT), positive train control (PTC) monitoring applications, dynamic brake monitoring (DBM) applications, locomotive (or other rail vehicle) interface gateway (LIG) applications, etc.

Since the applications and/or appliances 110 are connected on the battery-side of the knife switch 104, the applications and/or appliances 110 can remain on even when the engine is shut-off and be powered by the battery 106. Since the power management system 108 provides managed power at specific voltage levels to each of the applications and/or appliances 110, individual power supplies corresponding to each of the applications and/or appliances 110 can be eliminated. Accordingly, the power management system 108 facilitates a reduction in individual power management components and wiring. In this way, the rail vehicle system is made less complex and production/maintenance costs are reduced.

Note in some embodiments, the power management system may be connected on the power source side of the knife switch to manage distribution of power to applications and/or appliances connected between the power source and the knife switch. Accordingly, the power management system may be connected on either side of the knife switch to manage distribution of power to application and/or appliances of the rail vehicle system.

Furthermore, the power management system 108 communicates with various components of the rail vehicle system 100 to monitor operating conditions and/or send commands in order to provide power load shedding capabilities. The power management module 108 communicates with the battery 106 through battery communication line 119 to receive operating state information including battery power parameters. The power management module 108 communicates with the plurality of applications and/or appliances 110 through application and/or appliance communication lines 114 to receive operating state information including power usage parameters from each of the plurality of applications and/or appliances 110. The power management module 108 communicates with the AESS system 116 through AESS communication line 118 to receive operating state information including AESS monitored parameters, AESS criteria, and/or AESS commands.

When the knife switch 104 is closed and the engine is operating, the power management system 108 receives 74 VDC from the power source 102 to distribute to the plurality of applications and/or appliances 110. When the knife switch 104 is open, the power management system 108 receives power from the battery 106. When the locomotive or other rail vehicle is in the standby condition, some of the plurality of applications and/or appliances 110 remain on to provide communication, monitoring, and other suitable capabilities. As such, the selected applications and/or appliances that remain on generate a power load that dissipates the battery 106.

The power management system 108 determines the state of charge of the battery 106 based on the information received from the battery 106. The power management system 108 determines the power load based on the information received from the plurality of applications and/or appliances 110. The power management system 108 determines operating conditions and/or AESS commands based on information received from the AESS system 116. Based on the aggregate information received from the various components, the power management system 108 shuts off selected applications and/or appliances in a suitable manner according to a rule set to shed power load in order to preserve the state of charge of the battery 106. In particular, the power management system 108 sends notifications of imminent power loss to the selected applications and/or appliances a suitable duration before power is shut-off so that the selected applications and/or appliances are able to shut themselves down in order to prevent data loss and/or corruption. As an example, the notifications are sent as class C/D messages as is specified in the PTC communications architecture.

Furthermore, in some cases the rule set defines a load shedding priority where some applications and/or appliances are shut-off before other applications and/or appliances. As an example, the load shedding priority dictates that locomotive (or other rail vehicle) lights are shut-off prior to communication and/or monitoring applications and/or appliances. As another example, the load shedding priority dictates that an application and/or appliance that has a greater power load is shut-off prior to an application and/or appliance that has a lesser power load. As yet another example, applications and/or appliances located in one area of the rail vehicle system are shut-off prior to applications and/or appliances in another area of the rail vehicle system.

In some embodiments, the rule set is predefined so that an application and/or appliance shutdown priority is static. The priority can be set to accommodate needs and/or wants specific to a customer. In some embodiments, the rule set may be dynamic so as to adjust an application and/or appliance shutdown priority based on operating conditions. For example, the rule set may adjust priority depending on the device shut down, such as its health, state of data transmission, other state of operation and the like. In one particular example, if a router has data that has to be transmitted, the rule set may dynamically change to sequence the shut-off of other data sources to allow the router to transmit the information through a transmitter. After transmission, the router and the transceiver are sequenced for shut-off. Further, the rule set may accommodate for determining the criticality of the data being transmitted by the router and if it is determined that that data does not need to be transmitted immediately, the data is stored in non-volatile memory for retransmission when the router comes back up again and the router is commanded to shut itself off prior to impending power shut-off.

Since the power management system 108 communicates with the AESS system 116, the power management system 108 coordinates load shedding operations and/or overrides AESS commanded starting/stopping of the engine according to the rule set. As an example, the power management system 108 knows that the engine is to be started at a predetermined time in the near future and overrides an AESS commanded engine start and instead sheds power load to inhibit battery dissipation until the engine is started at the predetermined time.

Note the power management system coordinates load shedding with any suitable integrated system/device of the rail vehicle system. For example, the power management system communicates and coordinates with a locomotive (or other rail vehicle) computing system and other devices that perform similar power management functions that are integrated into the rail vehicle system. Further, the power management system can override operations of such a system/device to perform power load shedding.

Accordingly, the power management system 108 provides consistent vehicle-wide power management and distribution as well as load shedding capabilities in an integrated manner. This inhibits unnecessary engine operation, inhibits battery dissipation events, allows for suitable shut-off of applications and/or appliances to inhibit data loss and/or corruption, and allows selected applications and/or appliances to stay on as long as possible to provide communication, monitoring, etc. capabilities as long as possible during a standby condition. In this way, fuel is preserved, the locomotive (or other rail vehicle) engine is suitably started, and operating cost are reduced FIG. 2 is a block diagram of an example embodiment of a rail vehicle system 200 where the power management system 108 includes a modular power supply that provides power to a plurality of power distribution management panels that each control a plurality of applications and/or appliances that are distributed throughout the rail vehicle system 200. Components of the rail vehicle system 200 that may be substantially the same as those in rail vehicle system 100 shown in FIG. 1 and described above are identified in the same way and are described no further. However, it will be noted that components identified in the same way in different embodiments of the present disclosure may be at least partly different.

In the illustrated embodiment, the power management system 108 includes a modular power supply 120 that receives 74 VDC from the battery-side of the locomotive (or other rail vehicle) knife switch 104 and converts the native voltage to a plurality of different voltage levels (e.g., 12 VDC, 15 VDC, and 24 VDC) that are controlled separately at different outputs. The modular power supply 120 provides mounting and cost flexibility relative to device specific power supplies. Moreover, the modular power supply 120 provides increased heat dissipation benefits relative to separate power supplies.

The modular power supply 120 supplies power at the different voltage levels to a plurality of power distribution and management panels (PDMP), namely a first PDMP 124 and a second PDMP 126. The PDMPs receive the plurality of voltages and provide a way for electronic applications and/or appliances to attach to the PDMPs to receive power at the different voltage levels. By providing a plurality of PDMPs, various applications and/or appliances operating at different voltage levels that are distributed throughout the rail vehicle system can receive managed power locally. For example, the first PDMP 124 can be positioned in an electronics locker located in an alcove of the locomotive (or other rail vehicle) to provide managed power to applications and/or appliances local to the locomotive (or other rail vehicle). Further, the second PDMP 126 can be positioned in an electronics locker located near a traction motor to provide managed power to application and/or appliances local to the traction motor. Note a PDMP may be located in any suitable location in the rail vehicle system 200. In this way, device specific power supplies can be reduced or eliminated and the amount of wiring to supply power to the applications and/or appliances can be reduced.

The first PDMP 124 and the second PDMP 126 communicate with each other through PDMP communication line 128. The PDMPs provide operating state and power load information of applications and/or appliances connected to each of the PDMPs to each other in order to provide coordinated load shedding capabilities. In particular, one or more of the PDMPs can determine the total power load of the applications and/or appliances connected to all of the PDMPs to shut-off selected applications and/or appliances according to a rule set in order to shed power load for battery preservation. Fore example, the rules set may dictate that applications and/or appliances connected to the second PDMP are shut-off prior to applications and/or appliances connected to the first PDMP. Accordingly, when load shedding is performed, the first PDMP 124 and the second PDMP 126 communicate to coordinate shut-off of applications and/or appliances connected to the second PDMP 126.

The PDMPs provide notifications of impending shutdown events to applications and/or appliances in order to allow the applications and/or appliances to orderly shut themselves down. As an example, the notifications are sent as class C/D messages as specified in the PTC communications architecture. The coordinated power load shedding capabilities allow for more efficient power load shedding than otherwise would be possible without communication between the PDMPs.

Additionally (or optionally), the first PDMP 124 and the second PDMP 126 communicate with the AESS system 116 through the AESS communication line 118. In this way power load shedding is coordinated between the AESS system 116 and the first PDMP 124 and the second PDMP 126. The coordination between the PDMPs and the AESS system provide integrated, predefined, configurable load shedding to maintain suitable battery performance.

In some embodiments, one or more PDMPs can be virtual, that is, the PDMPs can be logical representations executable on a computing device. In some embodiments, the PDMPs can be a combination of hardware, firmware, and/or software for managing distribution of power to applications and/or appliances of the rail vehicle system.

FIG. 3 is a block diagram of an example embodiment of a rail vehicle system 300 where the power management system 108 includes a modular power supply that includes control logic that provides management to different voltage level output of the modular power supply. In particular, the control logic shuts-off the different outputs separately to provide power load shedding capabilities according to power load at a selected voltage level as opposed to device specific power load shedding.

The power management system 108 includes a modular power supply 120 that receives 74 VDC from the battery-side of the locomotive (or other rail vehicle) knife switch 104 and converts the native voltage to a plurality of different voltage levels (e.g., 12 VDC, 15 VDC, and 24 VDC) that are controlled separately at different outlets. The modular power supply 120 includes control logic 140 to provide voltage level specific power load shedding capabilities. The control logic 140 performs power load shedding by shutting off power to selected voltage level outputs according to a rule set based on received parameters, operating state information, and power load. For example, the control logic 140 shuts off all applications and/or appliances connected to the 12 VDC output according to the rule set in order to shed power load.

In the illustrated embodiment, a battery saving device 130 is positioned between the knife switch 104 and the battery 106 on the battery-side of the modular power supply 120. In some embodiments, the battery saving device 130 includes a motor (e.g., a diesel engine) that is selectively operable to provide additional power. The power saving device 130 is operable during standby conditions to delay power load shedding operations so that applications and/or appliances remain on longer. It will be appreciated that a battery saving device may include any suitable device that can be turned on or shut-off to preserve battery state of charge. Furthermore, the AESS system 116 is positioned between the knife switch 104 and the battery 106 on the battery-side of the battery saving device 130. The battery saving device 130 and the AESS system 116 are positioned on the battery-side of the knife switch 104 in order to coordinate battery preserving operation with the modular control logic 140 of the power supply 120. The modular power supply 120 with control logic 140 provides some load shedding capability as a lower cost alternative to PDMPs. Moreover, the modular power supply 120 can be installed in existing rail vehicle systems that do not include PDMPs to provide integrated management of power distribution and power load shedding capabilities that would otherwise not occur on existing rail vehicle systems.

FIG. 4 is a block diagram of an example embodiment of a rail vehicle system 400 where the power management system 108 includes a modular power supply that incorporates battery saving functionality into the modular power supply. In particular, a plurality of battery saving devices each corresponds to a different voltage level output of the modular power supply 120. A first battery saving device 142 corresponds to a first voltage level output (e.g., 12 VDC). A second battery saving device 144 corresponds to a second voltage level output (e.g., 15 VDC). A third battery saving device 146 corresponds to a third voltage level output (e.g., 24 VDC). The control logic 140 selectively commands operation of one or more of the battery saving devices to provide additional power to prolong operation of the applications and/or appliances connected to the voltage level output that corresponds to the battery saving device. For example, battery saving device 142 is turned on to provide additional power to applications and/or appliances connected to the 12 VDC output of the modular power supply 120. By incorporating the battery saving functionality into each voltage level module of the power supply, variably levels of selective load shedding can be performed with a simpler architecture and at a lower cost relative to configurations that include one or more PDMPs.

The configurations illustrated above enable various methods for managing distribution of power to electronic applications and/or appliances in a rail vehicle system. Accordingly, some such methods are now described, by way of example, with continued reference to above configurations. It will be understood, however, that these methods, and others fully within the scope of the present disclosure, may be enabled via other configurations as well. These methods may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system. It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Figure 5:
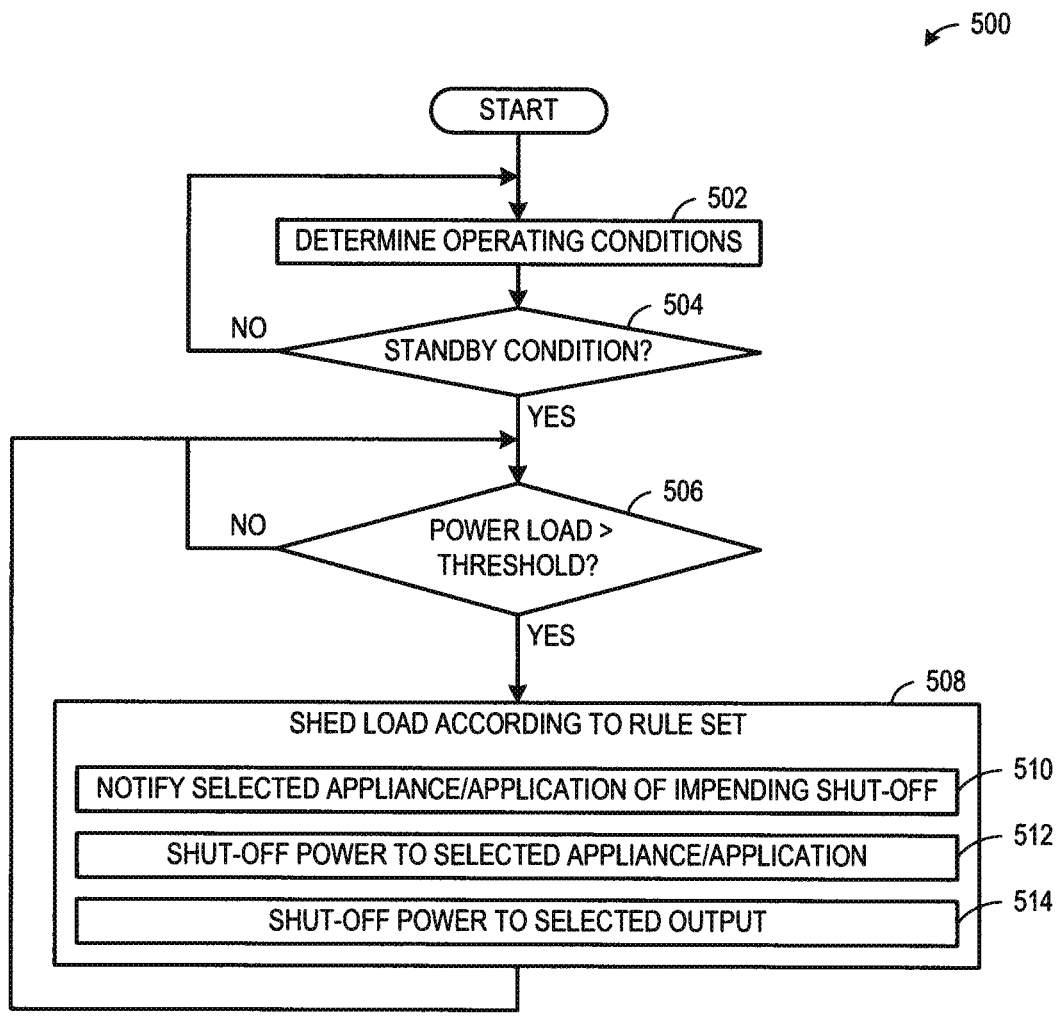
FIG. 5 shows an example embodiment of an available power based method for managing power distribution in a rail vehicle system.

FIG. 5 is a flowchart illustrating an example embodiment of a method 500 for managing power distribution in a rail vehicle system based on power available for consumption. In one example, the method 500 is performed by the power management system 108 as described above. At 502, the method may include determining operating conditions of the rail vehicle system. Determining operating conditions may include receiving information from various components of the rail vehicle system, such as the power source 102 (including the engine), the battery 106, the AESS system 116, the battery saving device 130, and/or the plurality of applications and/or appliances 110. Furthermore, determining operating conditions may include monitoring various parameters of the rail vehicle system. The parameters monitored may include, for example, ambient temperature, engine oil temperature, power source/knife switch voltage, battery voltage, application and/or appliance voltage, a battery state of charge, engine operating parameters, if applicable elapsed time since engine off, etc.

At 504, the method may include determining if a standby condition exists for the rail vehicle system. As an example, the standby condition exists when the engine is turned off and electronic applications and/or appliances are running off of power from the battery and/or other devices (e.g., battery saving devices). If it is determined that the standby condition exists, the method moves to 506. Otherwise the method returns to 502.

During the standby condition, the rail vehicle system may be stationary and parked, and further the engine may not be running. However, on-board electronics applications and/or appliances, such as an on-board locomotive (or other rail vehicle) monitoring system, radio communications, or a computer control system of the locomotive (or other rail vehicle) are maintained active during the standby condition. These electronics applications and/or appliances create a power load that lowers the state of charge of the battery. At 506, the method may include determining if the power load of the active applications and/or appliances is greater than a threshold. For example, the threshold may include a predefined level of the battery state of charge (e.g., a state of charge for restarting the engine). As another example, the threshold may include a predefined rate of dissipation of the battery state of charge. If it is determined that the power load is greater than the threshold the method moves to 508. Otherwise, the method returns to 506.

At 508, the method may include shedding power load according to a rule set. In some embodiments, the rule set may define a shutdown priority that is predefined. In some embodiments, the rule set and/or the priority may be dynamically adjusted based on operating conditions. The priority of the rule set can be defined according to customer preference. For example, the rule set may prioritize specific applications and/or appliances above other applications and/or appliances to remain on. As another example, the rule set may prioritize applications and/or appliances that with a smaller power load above applications and/or appliances with a greater power load to remain on. Note any suitably priority of application and/or appliance shutdown may be established in the rule set according to customer preference.

At 510, as part of shedding power load, the method may include notifying applications and/or appliances selected for shut-off of the impending shut-off. As an example, the power management system 108 sends a class C/D message as specified in the PTC communications architecture to notify a selected application and/or appliance of impending shut-off. The notification allows the selected applications and/or appliances to shut themselves down in an orderly manner to prevent data loss and/or corruption.

In some embodiments, the power management system 108 has the ability to shut-off power to a specific application and/or appliance, such as where the power management system includes one or more PDMPs. In such embodiments, at 512, as part of shedding power load, the method may include shutting off power to the selected application and/or appliance. In other words, the power management system 108 performs application and/or appliance specific power shut-off.

In some embodiments, the power management system 108 has the ability to shut-off power to an output at a specific voltage level and correspondingly to shut-off power to applications and/or appliances connected to that output. In such embodiments, at 514, as part of shedding power load, the method may include shutting off power to the selected voltage level output. In other words, the power management system 108 performs voltage level specific power shut-off. After performing the power load shedding operation the method moves to 506 to monitor the power load to see if it becomes greater than the threshold to comply with battery dissipation criteria of the rule set.

By selectively shutting off power to applications and/or appliances connected on a battery-side of a knife switch during a standby condition where an engine is shut-off, power load can be shed. In this way, battery dissipation events that result in delays and increased costs can be inhibited. Further, by shedding power load according to a priority of a rule set, application and/or appliance shut-off is performed in a directed and orderly manner that is customizable to customer preference. Further still, by notifying applications and/or appliances of an impending shut-off, they are able to suitably shut themselves down. In this way, data loss and/or corruption can be inhibited.

Figure 6:
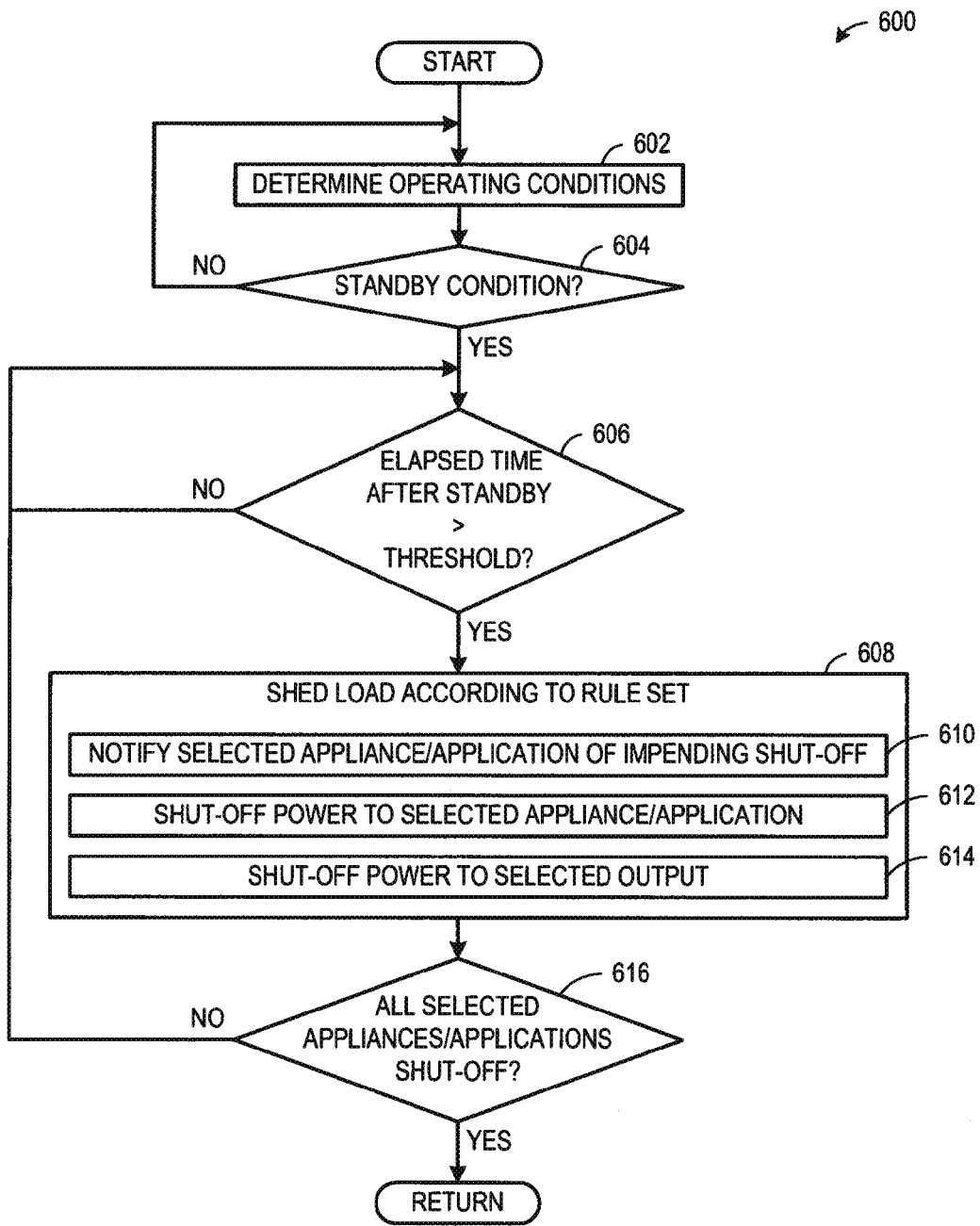
FIG. 6 shows an example embodiment of a time based method for managing power distribution in a rail vehicle system.

FIG. 6 illustrates an example embodiment of a time-based method 600 for managing power distribution in a rail vehicle system. In other words, a rule set dictates that applications and/or appliances are shut-off a specified time after engine shut-off according to a priority defined by the rule set. In one example, the method 600 is performed by the power management module 108 as described above. At 602, the method may include determining operating conditions of the rail vehicle system.

At 604, the method may include determining if a standby condition exists for the rail vehicle system. If it is determined that the standby condition exists, the method moves to 606. Otherwise the method returns to 602.

Power usage rates of each of the applications and/or appliances are pre-programmed into the power management system 108 so that the rule set defines elapsed time after engine shut-off for each of the applications and/or appliances to remain on without a battery dissipation event occurring. At 606, the method may include determining if an elapsed time after the start of the standby condition (or engine shut-off) is greater than a threshold. In some embodiments, the threshold is a specific duration for each application and/or appliance. In some embodiments, the threshold is specific to each of the voltage level outputs. If it is determined that the elapsed time after the start of the standby condition is greater than the threshold the method moves to 608. Otherwise, the method returns to 606.

At 608, the method may include shedding power load according to a rule set. At 610, as part of shedding power load, the method may include notifying applications and/or appliances selected for shut-off of the impending shut-off. In some embodiments, the power management system 108 has the ability to shut-off power to a specific application and/or appliance, such as where the power management system includes one or more PDMPs. In such embodiments, at 612, as part of shedding power load, the method may include shutting off power to the selected application and/or appliance. In other words, the power management system 108 performs application and/or appliance specific power shut-off. In some embodiments, the power management system 108 has the ability to shut-off power to an output at a specific voltage level and correspondingly to shut-off power to applications and/or appliances connected to that output. In such embodiments, at 614, as part of shedding power load, the method may include shutting off power to the selected voltage level output. In other words, the power management system 108 performs voltage level specific power shut-off. After shedding power load the method returns to 606 to monitor time thresholds for additional power load shedding to comply with the criteria of the rule set.

By managing distribution of power to applications and/or appliances and shedding power load according to a time based priority rule set, power load shedding can be performed in a directed and orderly manner. In this way, battery dissipation events can be inhibited.

Figure 7:
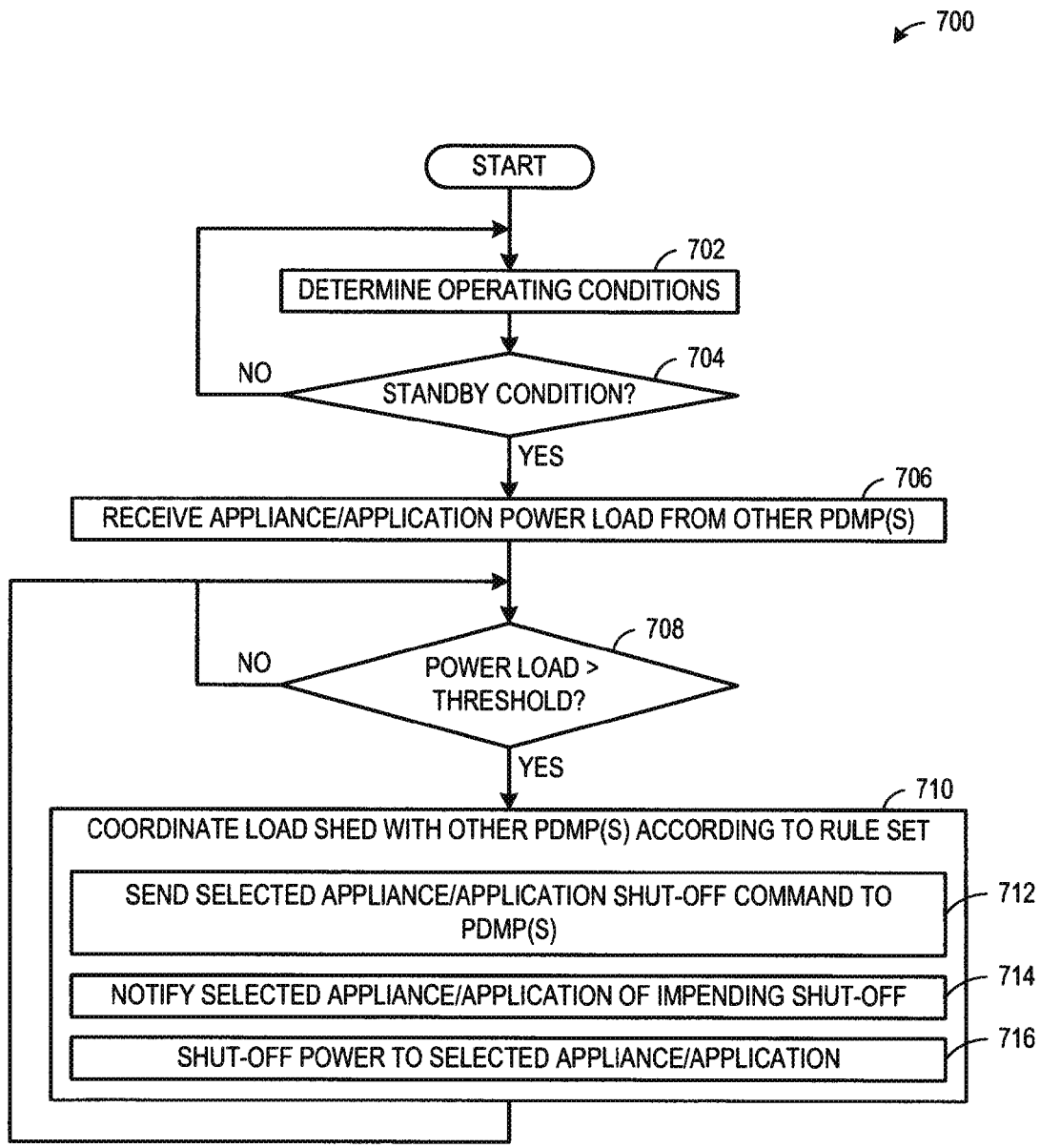
FIG. 7 shows an example embodiment of method for managing power distribution coordinated between a plurality of power distribution management panels in a rail vehicle system.

FIG. 7 illustrates an example embodiment of method 700 for managing power distribution coordinated between a plurality of power distribution management panels in a rail vehicle system. In one example, the method 700 is performed by the power management module 108, and more particularly by the first PDMP 124 and/or the second PDMP 126 as described above. At 702, the method may include determining operating conditions of the rail vehicle system.

At 704, the method may include determining if a standby condition exists for the rail vehicle system. If it is determined that the standby condition exists, the method moves to 706. Otherwise the method returns to 702.

At 706, the method may include receiving application and/or appliance operating state and/or power load information from other PDMP(s). The power management system 108 is able to determine a total or collective power load for all of the PDMPs to determine if power load shedding should be performed to inhibit battery dissipation. Further, the received information can be used to determine which active applications and/or appliances are prioritized above others to remain on.

At 708, the method may include determining if the total power load of the active applications and/or appliances connected to all of the PDMPs is greater than a threshold. If it is determined that the power load is greater than the threshold the method moves to 710. Otherwise, the method returns to 708.

At 708, the method may include shedding power load in a coordinated manner between all of the PDMPs according to a rule set. For example, different applications and/or appliances connected to different PDMPs may be shutdown based on the priority of the rule set. As another example, all applications and/or appliances connected to the first PDMP may be prioritized over all of the applications and/or appliances connected to the second PDMP to remain on. At 712, as part of shedding power load, the method may include sending application and/or appliance specific shut-off commands to the PDMPs to carry out power shut-off in a coordinated manner. At 714, as part of shedding power load, the method may include notifying applications and/or appliances selected for shut-off of the impending shut-off. At 716, as part of shedding power load, the method may include shutting off power to the selected application and/or appliance. After performing the power load shedding operation the method moves to 708 to monitor the power load to see if it becomes greater than the threshold to comply with battery dissipation criteria of the rule set.

By receiving application and/or appliance operating state and/or power usage information from other PDMPs, a total or collective power load can be determined so that accurate power load shedding can be performed. Further, by commanding shut-off of applications and/or appliances controlled by different PDMPs, power load shedding can be performed in a coordinated manner.

Figure 8:
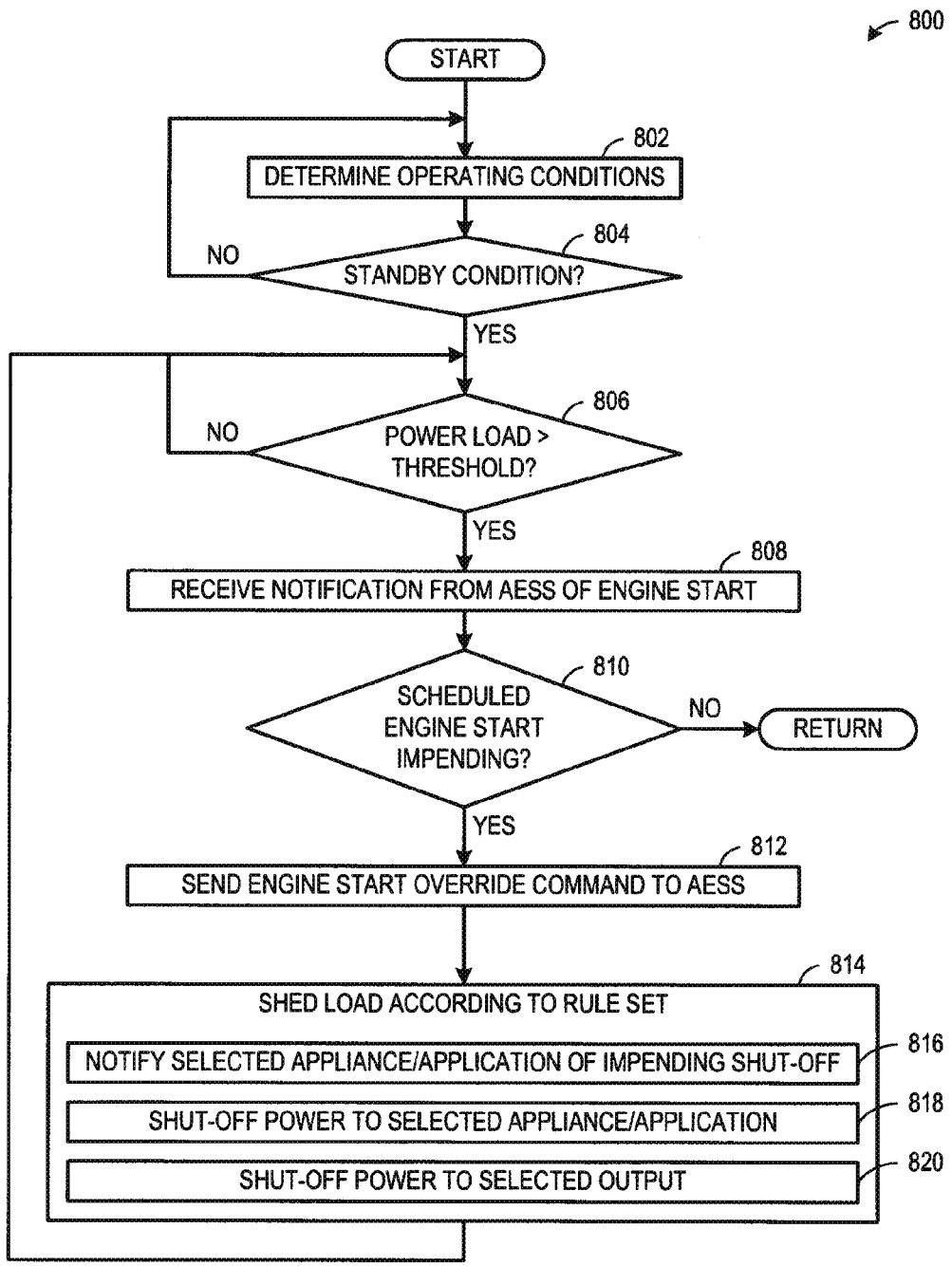
FIG. 8 shows an example embodiment of a method for managing power distribution coordinated between an automatic engine start stop (AESS) device and a power distribution management panel in a rail vehicle system.

FIG. 8 shows an example embodiment of a method for managing power distribution coordinated between an automatic engine start stop (AESS) device and a power distribution management panel in a rail vehicle system. In one example, the method 800 is performed by the power management module 108. At 802, the method may include determining operating conditions of the rail vehicle system.

At 804, the method may include determining if a standby condition exists for the rail vehicle system. If it is determined that the standby condition exists, the method moves to 806. Otherwise the method returns to 802.

At 806, the method may include determining if the total power load of the active applications and/or appliances is greater than a threshold. If it is determined that the power load is greater than the threshold the method moves to 808. Otherwise, the method returns to 806.

At 808, the method may include receiving notification of an impending AESS commanded engine start. As discussed above, the AESS system 116 may command an engine start to provide power to increase the state of charge of the battery 106 to a suitable level that complies with the AESS criteria.

At 810, the method may include determining if a scheduled engine start is impending. An engine start may be scheduled for variety of reasons. For example, to warm up the locomotive (or other rail vehicle) prior to leaving the rail yard or station. As another example, an engine start may be scheduled to perform routine service or maintenance. The power management system 108 may receive information from a connected application and/or appliance (e.g., TMC) of an engine start schedule through communication line 114 to determine if a scheduled engine start is impending. If it is determined that a scheduled engine start is impending the method moves to 812. Otherwise, the method returns to other operations.

At 812, the method may include sending an engine start override command to the AESS system. The override command cancels the AESS commanded engine start. Since a scheduled engine start is impending, the premature AESS commanded engine start is cancelled in favor of power load shedding to inhibit battery dissipation until the scheduled engine start.

At 814, the method may include shedding power load according to a priority of a rule set. At 816, as part of shedding power load, the method may include notifying applications and/or appliances selected for shut-off of the impending shut-off. In some embodiments, the power management system 108 has the ability to shut-off power to a specific application and/or appliance, such as where the power management system includes one or more PDMPs. In such embodiments, at 818, as part of shedding power load, the method may include shutting off power to the selected application and/or appliance. In other words, the power management system 108 performs application and/or appliance specific power shut-off. In some embodiments, the power management system 108 has the ability to shut-off power to an output at a specific voltage level and correspondingly to shut-off power to applications and/or appliances connected to that output. In such embodiments, at 820, as part of shedding power load, the method may include shutting off power to the selected voltage level output. In other words, the power management system 108 performs voltage level specific power shut-off. After performing the power load shedding operation the method moves to 806 to monitor the power load to see if it becomes greater than the threshold to comply with battery dissipation criteria of the rule set.

By coordinating load shedding operations with the AESS system, premature engine starting can be inhibited. In this way, fuel may be preserved and emissions may be reduced.

Note the power management system coordinates load shedding with any suitable integrated system/device of the rail vehicle system. For example, the power management system communicates and coordinates with a locomotive (or other rail vehicle) computing system and other devices that perform similar power management functions that are integrated into the rail vehicle system. Further, the power management system can override operations of such a system/device to perform power load shedding.

Figure 9:
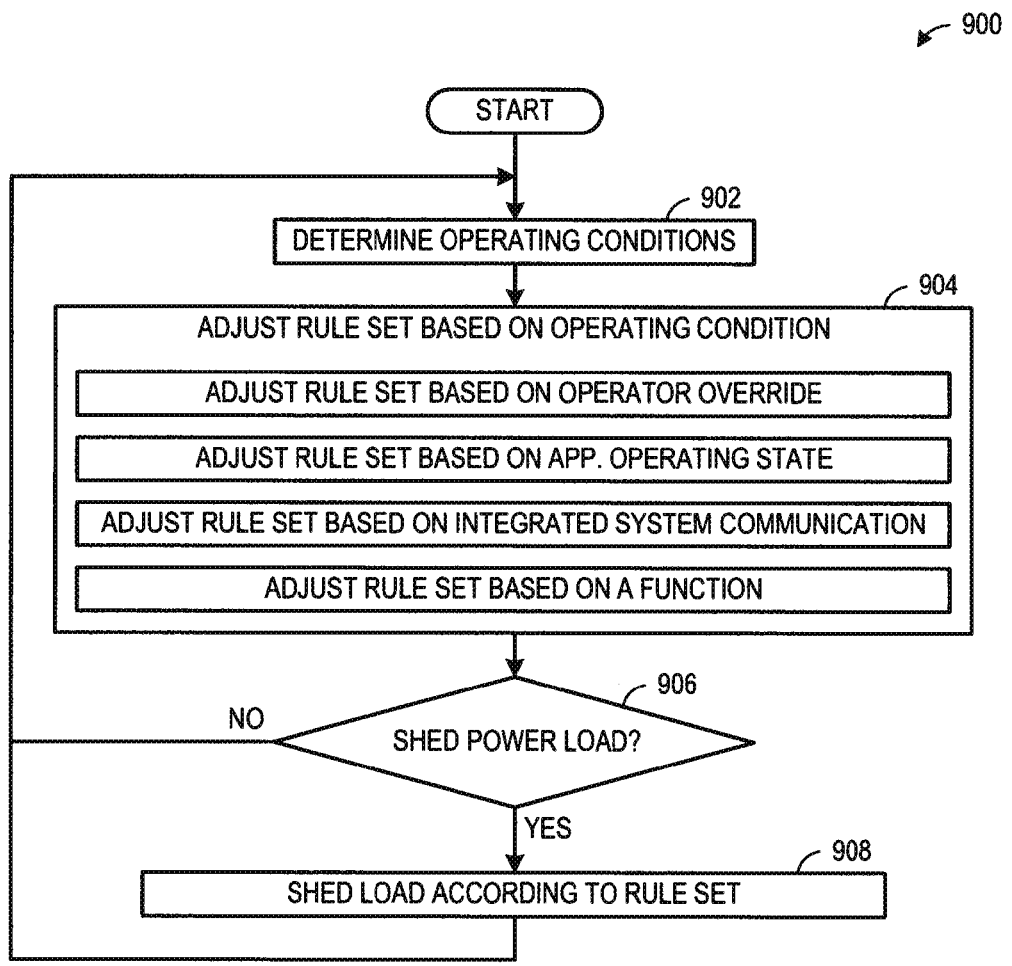
FIG. 9 shows an example embodiment of a method for managing power distribution according to a dynamically adjustable rule set in a rail vehicle system.

FIG. 9 shows an example embodiment of a method for managing power distribution according to a dynamically adjustable rule set in a rail vehicle system. In one example, the method 900 is performed by the power management module 108. At 902, the method may include determining operating conditions of the rail vehicle system.

At 904, the method may include adjusting the rule set based on an operating condition. For example, the method may include adjusting the rule set based on receiving an operator commanded override. The override may dictate an application and/or appliances remain on, such as for performing maintenance and/or service on the application and/or appliance. As another example, the method may include adjusting the rule set based on an operating state of a specific application and/or appliance. In one particular example, a router may remain on if it is determined that it has to transmit data and the rule set is adjusted to sequence other applications and/or appliances for shut-off while the router is transmitting data. As yet another example, the method may include adjusting the rule set based on communication/coordination with integrated systems/devices of the rail vehicle system. In one particular example, power management is coordinated among a neutral network of integrated devices and the rule set is adjusted based on a command received from a node device of the neural network. As yet another example, the method may include adjusting the rule set based on a mathematical function. In one particular example, the rule set is adjusted by time variant and time dependent Taylor series rules with at least one variable and/or parameter set. In some embodiments, the rule set may adjusted based on more than one operating condition.

At 904, the method may include determining if power load generated by applications and/or appliances on a battery is to be shed. As discussed above, shedding power load can be performed based on the rule set which varies as operating conditions change. If it is determined that power load is to be shed the method moves to 908. Otherwise the method returns to 902.

At 908, the method may include shedding power load according to the resultant rule set that is adjusted based on the determined operating conditions.

By adjusting the rule set dynamically based on operating conditions, application and/or appliance shutdown and/or priority of application and/or appliance shutdown can be adjusted to accommodate variations in operating conditions. In this way, applications and/or appliances may remain on under certain conditions to provide desired functionality.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A rail vehicle system comprising:
a power source to generate electrical power;
a battery to store electrical power generated by the power source;
a knife switch connected between the power source and the battery, the knife switch being actuatable to disconnect the battery from the power source; and
a power management system connected on either side of the knife switch for managing selective distribution of power to a plurality of electronic applications or appliances based on a rule set that determines an order in which operation of the plurality of electronic applications or appliances is modified, the power management system being configured to, during a standby condition in which the knife switch is in a state that disconnects the battery from the power source, shed power load on the battery in response to a power load of the plurality of electronic applications or appliances being greater than a threshold defined by the rule set, and dynamically adjust the order in which operation of the plurality of electronic applications or appliances is modified based on an operating condition.

2. The rail vehicle system of claim 1, wherein the power management system, during a standby condition, shuts off power to one or more selected electronic applications or appliances in response to an elapsed time after start of the standby condition being greater than a threshold defined by the rule set.

3. The rail vehicle system of claim 1, wherein the power management system further comprises:
a modular power supply that converts power at a native voltage level received from the power source or the battery to a plurality of different voltage levels, the modular power supply comprising:
a plurality of outputs that each correspond to a different voltage level; and
control logic to manage power distribution separately at each of the plurality of outputs.

4. The rail vehicle system of claim 3, wherein each of the plurality of outputs supplies power to one or more of the plurality of electronic applications or appliances, and the control logic, during a standby condition, shuts off power to one or more selected outputs in response to a power load of the plurality of electronic applications or appliances being greater than a threshold defined by the rule set.

5. The rail vehicle system of claim 4, wherein the modular power supply further comprises:
one or more battery saving devices; and
the control logic, during the standby condition, selectively operates the one or more battery saving devices to prolong operation of one or more of the plurality of electronic applications or appliances.

6. The rail vehicle system of claim 3, wherein the power management system further comprises:
a first power distribution management panel receiving power from each of the plurality of outputs, the first power distribution management panel managing power distribution to some of the plurality of electronic applications or appliances; and
a second power distribution management panel receiving power from each of the plurality of outputs, the second power distribution management panel managing power distribution to some of the plurality of electronic applications or appliances; and
a communication line connecting the first power distribution management panel and the second power distribution management panel, the first power distribution management panel and the second power distribution management panel coordinating power load shedding by selectively shutting off power to one or more selected electronic applications or appliances connected to the first power distribution management panel or one or more selected electronic applications or appliances connected to the second power distribution management panel in response to a power load of the plurality of electronic applications or appliances being greater than a threshold defined by the rule set.

7. The rail vehicle system of claim 1, wherein the power source comprises an engine, the rail vehicle system further comprising:
an automatic engine start stop system; and
an automatic engine start stop system communication line connecting the automatic engine start stop system and the power management system, the power management system overriding a received engine start command of the automatic engine start stop system, and performing load shedding by shutting off power to one or more selected electronic applications or appliances.

8. A method comprising:
during a standby condition in which a knife switch is in a state that disconnects a battery from a power source, shedding power load on the battery in response to a power load of a plurality of electronic applications or appliances connected on a battery-side of the knife switch being greater than a threshold defined by a rule set that determines an order in which operation of the plurality of electronic applications or appliances is modified to shed power load; and
dynamically adjusting the order in which operation of the plurality of electronic applications or appliances is modified based on an operating condition.

9. The method of claim 8, wherein shedding power load comprises:
shutting off power to one or more selected electronic applications or appliances.

10. The method of claim 8, wherein shedding power load comprises:
notifying one or more selected electronic applications or appliances of an impending power shut-off prior to shedding power load by shutting off power to the one or more selected electronic applications or appliances.

11. The method of claim 8, wherein the plurality of electronic applications or appliances connect to different outputs that each corresponds to a different voltage level of a modular power supply; and shedding power load comprises:
shutting off power to one or more of the different outputs in response to the power load of the plurality of electronic applications or appliances being greater than the threshold.

12. The method of claim 8, wherein some of the plurality of electronic applications or appliances are connected to a first power distribution management panel and some of the plurality of electronic applications or appliances are connected to a second power distribution management panel, the method comprising:
during the standby condition, coordinating power load shedding between the first power distribution management panel and the second power distribution management panel by shutting off power to some of the plurality of electronic applications or appliances connected to the first power distribution management panel or some of the plurality of electronic applications or appliances connected to the second power distribution management panel in response to a power load of the plurality of electronic applications or appliance being greater than a threshold defined by the rule set.

13. The method of claim 8, further comprising:
receiving notification of an engine start command or battery saving device operating command; and
overriding the engine start command or battery saving device operating command to perform shedding power load.

14. A rail vehicle system comprising:
a power source to generate electrical power;
a battery to store electrical power generated by the power source;
a knife switch connected between the power source and the battery, the knife switch being actuatable to disconnect the battery from the power source; and
a power management system connected between the knife switch and the battery, the power management system comprising:
 a modular power supply that converts power at a native voltage level received from the power source or the battery to a plurality of different voltage levels at a plurality of outputs that each corresponds to a different voltage level;
 a first power distribution management panel receiving power from each of the plurality of outputs, the first power distribution management panel managing power distribution to some of a plurality of electronic applications or appliances at each of the different voltage levels;
 a second power distribution management panel receiving power from each of the plurality of outputs, the second power distribution management panel managing power distribution to some of the plurality of electronic applications or appliances at each of the different voltage levels; and
 a communication line connecting the first power distribution management panel and the second power distribution management panel.

15. The rail vehicle system of claim 14, wherein the first power distribution management panel and the second power distribution management panel, during a standby condition, coordinate power load shedding by selectively shutting off power to one or more selected electronic applications or appliances connected to the first power distribution management panel or one or more selected electronic applications or appliances connected to the second power distribution management panel in response to a power load of the plurality of electronic applications or appliances being greater than a threshold defined by a rule set.

16. The rail vehicle system of claim 15, wherein the one or more selected electronic applications or appliances are selected for shut-off based on a priority defined by the rule set.

17. The rail vehicle system of claim 14, further comprising:
an automatic engine start stop system; and
an automatic engine start stop system communication line connecting the automatic engine start stop system and the power management system, the power management system overriding a received engine start command of the automatic engine start stop system, and performing load shedding by shutting off power to one or more selected electronic applications or appliances.

* * * * *